United States Patent [19]

Baginski

[11] Patent Number: 4,931,792

[45] Date of Patent: Jun. 5, 1990

[54] SHAFT ANGLE ENCODER INTERFACE

[75] Inventor: Mark J. Baginski, Boyd Tavern, Va.

[73] Assignee: Sperry Marine Inc., Charlottesville, Va.

[21] Appl. No.: 191,922

[22] Filed: May 9, 1988

[51] Int. Cl.$^5$ ............................................. H03M 1/30
[52] U.S. Cl. ............................... 340/870.19; 360/72.2; 377/17
[58] Field of Search ............... 340/870.19, 686, 870.29; 250/231 SE; 341/116, 111, 115, 2; 360/72.2; 377/17, 51; 318/661

[56] References Cited

U.S. PATENT DOCUMENTS

| 4,558,304 | 12/1985 | Wand | 341/115 |
| 4,714,913 | 12/1987 | Cohen | 250/231 SE |
| 4,752,846 | 6/1988 | Proehl | 360/72.2 |

*Primary Examiner*—Donald J. Yusko
*Assistant Examiner*—Yuk H. Lau
*Attorney, Agent, or Firm*—Seymour Levine

[57] ABSTRACT

A shaft angle encoder interface for quadrature channel incremental shaft angle encoders utilizes a quadrature decoder/counter interface integrated circuit for providing a digital signal output representative of the angle. The digital signal output is provided by a high byte and low byte multiplexer. The integrated circuit includes inhibit logic for inhibiting updating the data when the output is read. A state machine controls latches that receive the high byte and low byte to assemble an output digital angle signal and provides control signals to the integrated circuit so that the inhibit mode is not activated.

11 Claims, 4 Drawing Sheets

SHAFT ANGLE ENCODER INTERFACE

BACKGROUND OF THE INVENTION

1. Field of the Invention

The invention relates to shaft angle encoder interface apparatus, particularly with respect to incremental shaft angle encoders having quadrature channel outputs.

2. Description of the Prior Art

Shaft angle encoders are utilized to measure the angular position of a rotating shaft. For example, the angle of a rotating antenna shaft with respect to a reference point in a radar system is utilized to display radar targets at the appropriate display bearings. Such shaft angle encoders may be of the incremental optical type that provide quardature square waves and a reference pulse which are decoded to indicate the shaft angle. The reference pulse may be utilized to provide an azimuthal reference at, for example, 0° from which shaft rotation is measured. The reference pulse occurs once every 360°. The quadrature square waves relate to the rotation of the shaft with respect to angular position and direction of rotation. The quadrature square waves are generated optically by a rotating code wheel in the optical shaft angle encoder. Two tracks of radial slits on the rotating code wheel generate the quadrature square waves. Each of the tracks is comprised of alternating slits and opaque areas of equal width, one track being displaced 90° with respect to the other track. Light passing through the slits on the rotating code wheel impinge upon photodetectors associated with each of the tracks, thereby generating voltages. Since the code wheel is rotating, the photodetectors receive alternating periods of light and dark thereby generating the quadrature square waves. The reference pulse is generated by a slit on the rotating code wheel at a reference position. The amount of rotation can be determined by counting the number of transitions from zero to a positive voltage and the direction of rotation is decoded by processing the quadrature square waves. Thus, the angular position of the shaft is encoded by the shaft angle encoder as square waves out-of-phase with respect to each other by 90°. These quadrature channel square waves require decoding to provide the angular resolution.

Such shaft angle encoders require interface electronics to convert the quadrature square waves into a digital angle for use in the system. For example, in a radar display system, the digital angle may be utilized by the video system for positioning the radar targets at the proper bearings. The interface logic required to accomplish the decoding conversion from quadrature square wave channels to a digital angle utilizing logic chips, such as gate arrays or discrete logic devices can be extensive, and hence very expensive, particularly with respect to determining the direction of rotation. Alternatively, integrated circuits are available for decoding quadrature channels when interfaced with a microprocessor. A chip of this type is available from the Hewlett Packard Company as the Quardature Decoder/Counter Interface IC denoted as the HCTL-2000. Technical data sheets dated Oct. 19, 1985 for the HCTL-2000 are available from Hewlett Packard and are incorporated herein by reference. The HCTL-2000 decodes quadrature square waves and provides a 12 bit digital angle when interfaced with a microprocessor which provides control signals to the HCTL-2000. The use of the microprocessor is undesirable because of the excessive cost and board real estate required therefor. The microprocessor requires extensive source code assembly language preparation which must be downloaded into program memory. Since the microprocessor must be programmed to effect its control and decoding functions, the cost of the software and the cost of the microprocessor adds an undesired expense to the system.

A further disadvantage of the quadrature channel decoding chip-microprocessor interface is that chips such as the HCTL-2000 have an internal inhibit mode that is automatically enabled during the time that the digital angle is read from the chip output. During enablement of the inhibit mode, the inhibit logic latches the current angle preventing updating from the shaft angle encoder of the chip output angle. Although the digital angle from the shaft angle encoder may change during the inhibit mode, the output angle from the HCTL-2000 is not changed until the inhibit mode is reset. Because the updating of the angle information is limited with such system, the display generally lags some incremental angular error behind the actual shaft position. Although the data is maintained stable during the readout period, the accuracy of the system is adversely affected since the data transfer rate of the system is reduced. It is appreciated, however, that the HCTL-2000 includes internal update buffering for a limited number of clock cycles. Updated data that occurs during the inhibit mode beyond this limited time period is lost.

SUMMARY OF THE INVENTION

The invention utilizes a state machine, preferably implemented by a programmable logic device (PLD), to control the quadrature channel decoding chip such as the HCTL-2000. The state machine provides an updated digital angle every data sample time thereby disabling the decoding chip inhibit mode. The angular data is updated at the fastest possible rate and the cost and amount of hardware required to transform the shaft angle encoder output into a digital angle is minimized. The invention minimizes the system cost by utilizing the state machine to drive the HCTL-2000 instead of the microprocessor for which the HCTL-2000 was designed. PLD's are less costly than microprocessors and do not require the writing of extensive source code programming as do microprocessors. The state machine provides an updated digital angle at a substantially faster rate than the microprocessor interfaces.

DESCRIPTION OF THE PREFERRED EMBODIMENT

Figure 1:
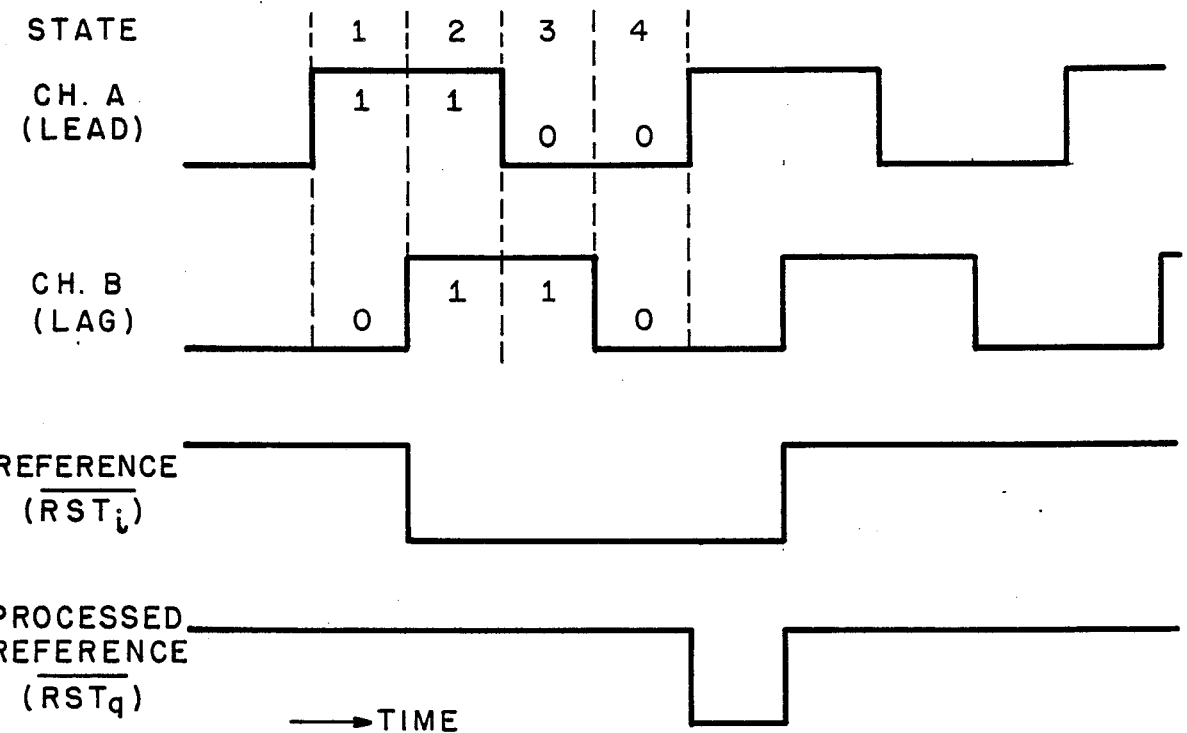
FIG. 1 is a graph of quadrature square waves and the reference pulse generated by an incremental shaft angle encoder. The reference pulse processed in accordance with the present invention is also illustrated.

Referring to FIG. 1, the quadrature channel square wave outputs of the shaft angle encoder are illustrated. The output denoted as channel A leads the angular position by 45° and the output designated as channel B lags the angular position by 45°. Thus, the channel B square wave output is in quadrature with the channel A square wave output. The channel A and channel B voltage levels represent four cyclically repeated states denoted as 1, 2, 3, and 4. In state 1, channel A is binary ONE and channel B is binary ZERO. In state 2, both channels are binary ONE. In state 3, channel A is binary ZERO and channel B is binary ONE and in state 4, both channels are binary ZERO. The incremental position of the encoder is tracked by detecting transitions in the state and incrementing or decrementing an up/down counter to provide a digital readout of the angle. The direction of rotation is decoded by comparing the previous state to the current state and controlling the counter accordingly. For example, the counter is controlled to count up for state transitions in the order 1, 2, 3, 4, 1, etc. and is controlled to count down for state transitions in the order 1, 4, 3, 2, 1, etc. FIG. 1 also illustrates the reference pulse which is utilized to reset the up/down counter to zero. Typically, the reference pulse spans one cycle of the channel A and channel B square waves. In a manner to be explained, and reference pulse is processed to provide a processed reference pulse as illustrated so that the angle is held at zero for one count instead of four counts.

Figure 2:
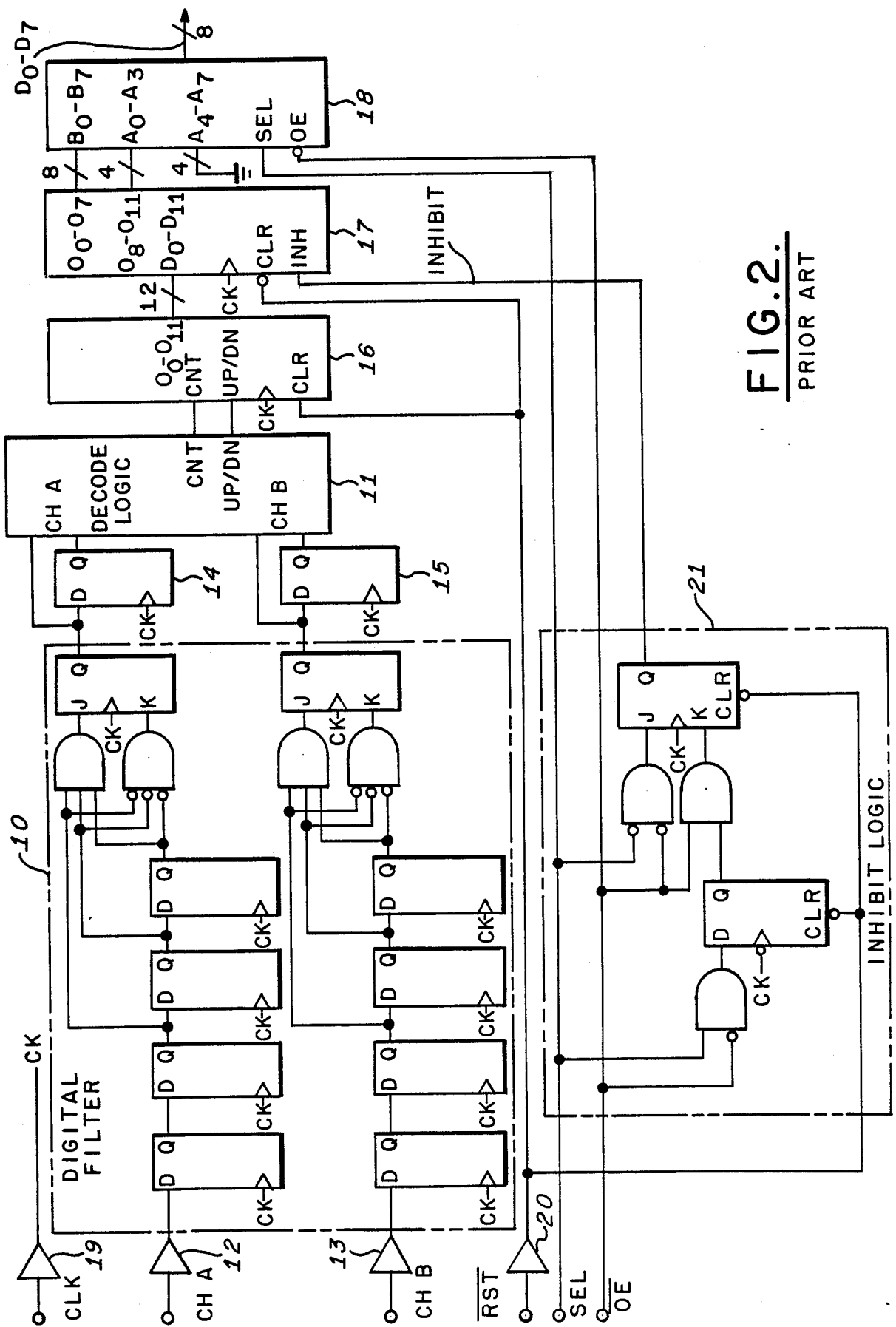
FIG. 2 is a schematic block diagram of the HCTL-2000 chip.

Referring to FIG. 2, a schematic block diagram of the HCTL-2000 chip utilized in the present invention is illustrated. Although a detailed description of the HCTL-2000 chip is incorporated herein by reference to the Hewlett-Packard data sheets therefor, a brief description is provided for convenience. The chip includes a digital filter 10 to reduce noise and decode logic 11 to decode the quadrature square waves from the shaft angle encoder into a digital angle at output $D_0$–$D_7$. The quadrature square waves from the encoder are applied at CH A and CH B, respectively to the digital filter 10 through Schmitt trigger inputs 12 and 13. The digital filter 10 is configured to provide a new output for each channel if the input level has had the same value on three consecutive rising clock edges. Otherwise, the output of the filter remains unchanged. In this manner, noise is rejected from the incoming quadrature signals. The channel A and channel B outputs from the filter 10 are applied to decode logic 11 directly and through respective D-flip-flops 14 and 15 so that the decode logic 11 receives the previous sampled state and the current sampled state. If the two states are different, the decode logic 11 provides a count signal CNT and an up/down signal UP/DN to a twelve bit binary counter up/down counter 16. As discussed above with respect to FIG. 1, the counter 16 is incremented or decremented when the previous sampled state of the quadrature square waves is different from the current state and the direction of count is controlled by comparing the states.

The twelve bit angle output of the counter 16 is applied to a twelve bit latch 17 which provides an eight bit byte (high byte) and a four bit byte (low byte) to an octal two byte multiplexer buffer 18. The buffer 18 output $D_0$–$D_7$ provides the resulting digital angle. The angle is read in two sequential bytes (high byte and low byte) to provide a twelve bit result.

The output enable input ($\overline{OE}$) controls the chip readout and the select input (SEL) controls the readout of the high byte and the low byte. A clock signal CLK is applied through a Schmitt trigger input 19 to provide the clock input CK. CK control the sampling of the $\overline{OE}$ and SEL lines as well as controlling the operation of the digital filter 10, the D-flip-flops 14 and 15, the counter 16 and the latch 17. The reference pulse from the shaft angle encoder is applied at $\overline{RST}$ through a Schmitt trigger input 20 to reset the angle to zero. The reset pulse clears the counter 16 and the latch 17.

The HCTL-2000 chip includes inhibit logic 21 for inhibiting data entry into the latch 17 when the buffer 18 is in the process of being read out. Thus, during this time, changes in the angle data in the counter 16 may be lost. The inhibit logic 21 provides the inhibit signal to the latch 17 when $\overline{OE}$, $\overline{SEL}$ and CK are simultaneously low.

The following illustrates a typical cycle of operation of the HCTL-2000 chip.

| STEP | SEL | OE | CLK | INHIBIT SIGNAL | ACTION |
|------|-----|----|----|----------------|--------|
| 1 | L | L | FALLING EDGE | 1 | SET INHIBIT; READ HIGH BYTE |
| 2 | H | L | FALLING EDGE | 1 | READ LOW BYTE; STARTS INHIBIT LOGIC RESET |
| 3 | X | H | FALLING EDGE | 0 | COMPLETES INHIBIT LOGIC RESET |

Figure 3:
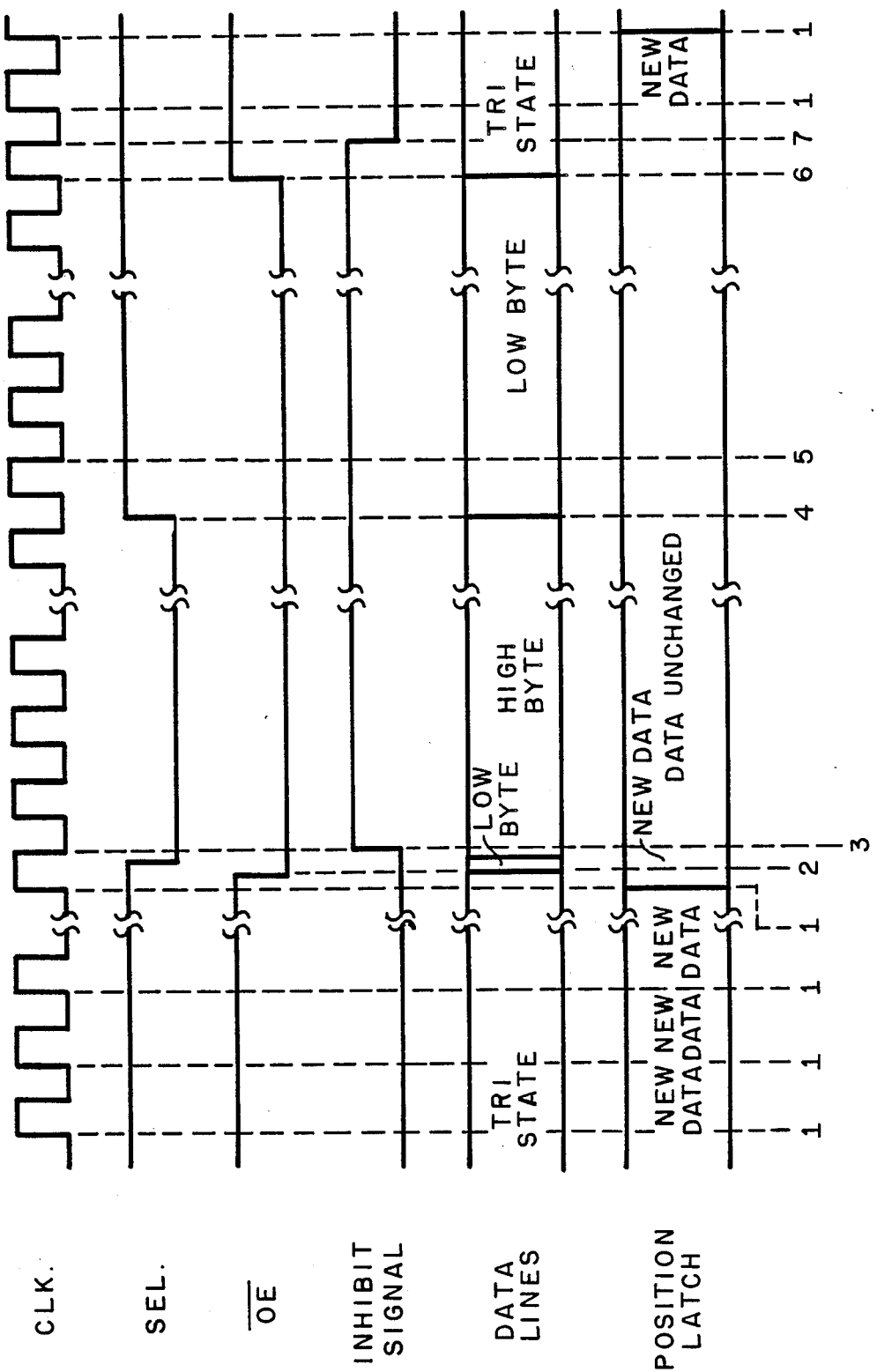
FIG. 3 is a timing diagram of the operation of the HCTL-2000 chip.

Referring to FIG. 3, with continued reference to FIG. 2, a timing diagram for the HCTL-2000 chip is illustrated. The following actions are referenced to the encircled numerals on FIG. 3.

Action 1. On the rising edge of the clock, data from the counter 16 is transferred to the position data latch 17, provided the inhibit signal is low.

Action 2. When $\overline{OE}$ goes low, the outputs of the multiplexer 18 are enabled onto the data lines $D_0$–$D_7$. If SEL is low, the high order data bytes are enabled onto the data lines. If SEL is high, the low order data bytes are enabled onto the data lines.

Action 3. When the HCTL-2000 detects a low on $\overline{OE}$ and SEL during a falling clock edge, the internal inhibit signal is activated. This action blocks new data from being transferred from the counter 16 to the latch 17.

Action 4. When SEL goes high, the data outputs change from high byte to low byte.

Action 5. A first condition for resetting the inhibit logic 21 is satisfied when the HCTL-2000 detects a logic high on SEL and a logic low on $\overline{OE}$ during a falling clock edge.

Action 6. When $\overline{OE}$ goes high, the data lines change to a high impedance state.

Action 7. To complete the reset of the inhibit logic 21, after the first reset condition has been satisfied, the HCTL-2000 requires a logic high on $\overline{OE}$ during a falling clock edge.

It is appreciated that in prior art use of the HCTL-2000 chip, the shaft angle encoder provides the CH A, CH B and $\overline{RST}$ signals. A microprocessor (not shown) provides CLK, SEL and $\overline{OE}$ and receives the sequentially provided high byte and low byte on the data lines $D_0$–$D_7$ so as to format a twelve bit digital angle. Software must be written for and loaded into the microprocessor to control providing and receiving these signals and to operate the HCTL-2000 in accordance with the timing diagram of FIG. 3. Such software is complex, extensive and expensive and in addition the microprocessor imposes an undesirable expense and board real estate requirement on the system.

Figure 4:
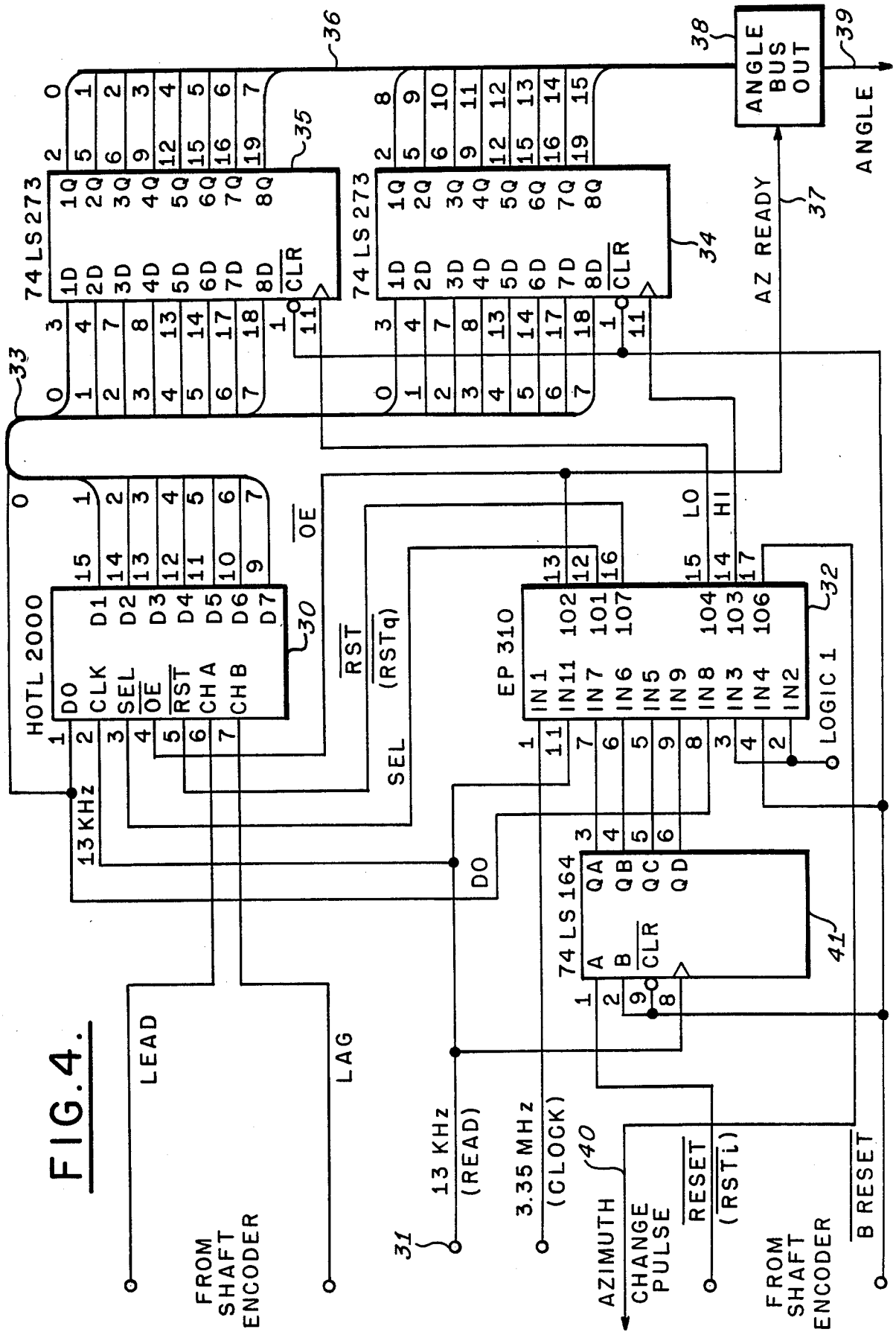
FIG. 4 is a schematic block diagram of the shaft angle encoder interface implemented in accordance with the present invention.

Referring to FIG. 4, a schematic block diagram of the shaft angle encoder interface of the present invention is illustrated. The interface includes an HCTL-2000 chip 30 coupled to receive the lead and lag quadrature and channel signals from the shaft angle encoder at pins 6 and 7 thereof. The CLK input to the HCTL-2000 is applied at pin 2 thereof from a 13 KHz clock source provided by the system at a terminal 31. The HCTL-2000 receives the SEL and $\overline{OE}$ signals at pins 3 and 4 thereof respectively. These control signals are generated by a state machine 32 preferably implemented by an EP310 PLD commercially available, for example, from the Altera Corporation. The EP310 also provides the reset pulse $\overline{RST}$ to the HCTL-2000 at pin 5 thereof, in a manner to be described. The chip outputs of the HCTL-2000 $D_0$–$D_7$ are provided at the output pins illustrated and are applied to an eight-bit parallel bus 33. The bus 33 is connected in parallel to the inputs of a high byte latch 34 and to the inputs of a low byte latch 35. The latches 34 and 35 sequentially receive the high byte and the low byte from the HCTL-2000 to assemble a twelve bit digital angle on a bus 36. The latches 34 and 35 are preferably implemented by 74LS273 chips available, for example, for Texas Instruments, Incorporated. The latches 34 and 35 are controlled by the EP310 in a manner to be described. The digital angle output on the bus 36 is provided to the system under control of an azimuth ready signal AZREADY on a line 37. The interface output is schematically represented by an Angle Bus Out block 38 under control of the AZREADY signal to provide the interface angle on an output bus 39. The $\overline{OE}$ signal from the EP310 provides the azimuth ready signal so that bus reads are disabled during the time the HCTL-2000 is transferring the high and low bytes to the latches 34 and 35.

The EP310 receives a 3.36 MHz system clock at pin 1 thereof and also receives the 13 KHz clock from the terminal 31 at pin 11 thereof. The 13 KHz clock is utilized as a READ signal by the EP310 to provide a digital angle sample. Pins 2 and 3 of the EP310 are connected to logic ONE for internal gating purposes. A signal $\overline{BRESET}$ is coupled to the EP310 as well as to the latches 34 and 35 to reset these components when the system in which the interface is utilized issues a board reset pulse for clearing the interface. The $D_0$ signal from the HCTL-2000 is applied to pin 8 of the EP310 and is utilized therein to generate an azimuth change pulse signal on a line 40 whenever the least significant bit of the digital angle changes. The azimuth change pulse signal on the line 40 is utilized for timing and control purposes within the system in which the interface of FIG. 4 is utilized.

The reset pulse from the shaft angle encoder is applied to a parallel output serial shift register implemented, for example, by a 74LS164 integrated circuit chip 41 available from, for example, Texas Instruments, Incorporated. The 74LS164 is coupled to the EP310 for processing the reset pulse to thereby provide $\overline{RST}$ to the HCTL-2000. Processing is effected to convert the reset pulse that spans four counts of the shaft angle encoder to the $\overline{RST}$ pulse that occurs for one count at 0° of the encoder. The 74LS164 is clocked by the 13 KHz signal from the terminal 31 and is reset by the board reset pulse $\overline{BRESET}$.

Figure 5:
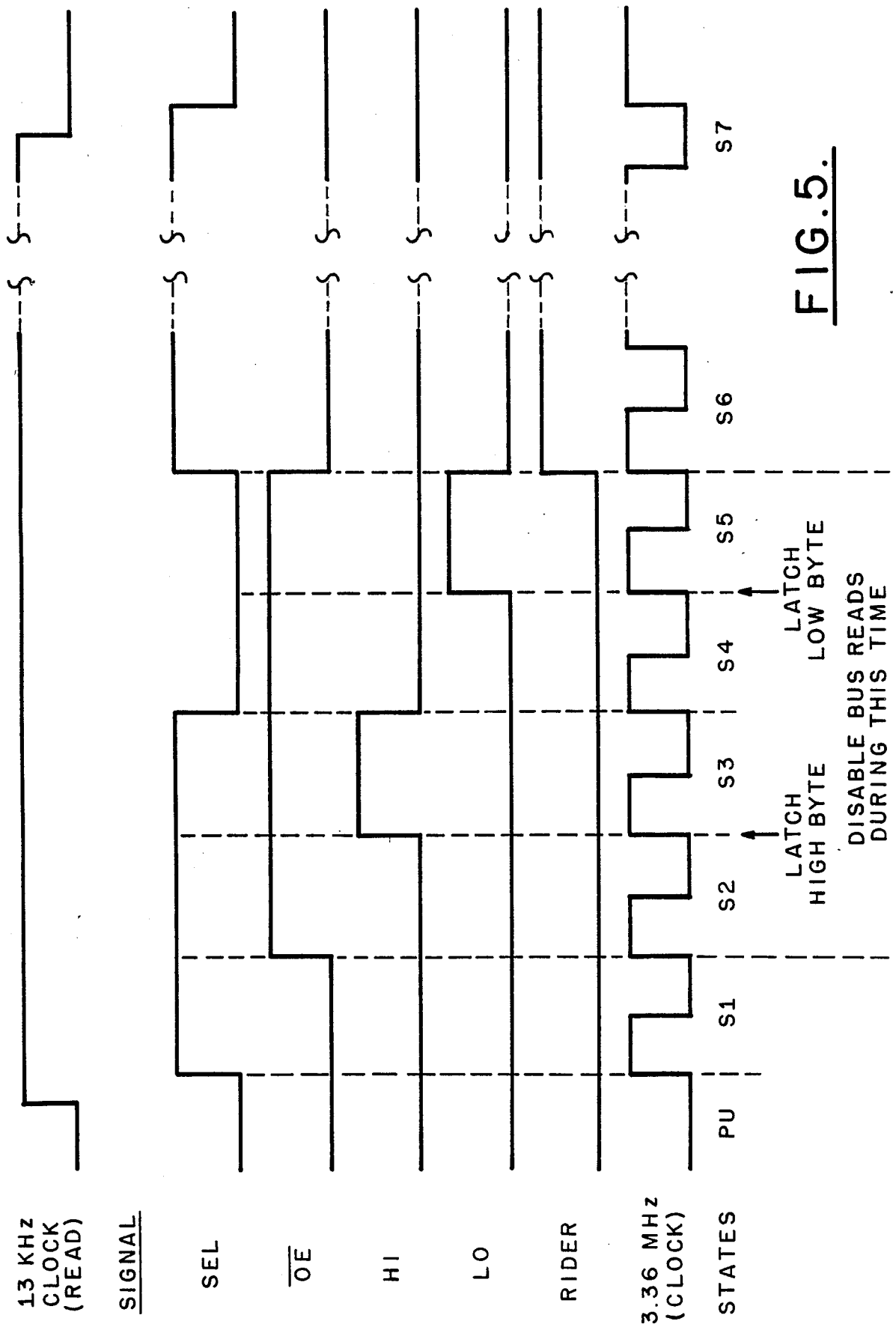
FIG. 5 is a state machine timing diagram of the apparatus of FIG. 4.

The state machine 32 generates the SEL, $\overline{OE}$ and $\overline{RST}$ signals for the HCTL-2000 as well as signals HI and LO for the latches 34 and 35, respectively, in response to the 13 KHz READ pulse for the terminal 31 and the 3.36 MHz clock. The timing for the operation of the state machine 32 is illustrated in FIG. 5. The programming equations utilized to implement the state machine 32 are as follows:

```
STATE MACHINE
INPUTS:
% read %
READ
% CLOCK %
CLK
OUTPUTS:
% hctl 2000 select line %
SEL
% hctl 2000 enable %
OE
% Signal to high byte latch %
HI
% Signal to low byte latch %
% Dummy variable necessary to distinguish S1 and S6%
RIDER
MACHINE: STATE MACHINE
CLOCK: CLK
    STATES:  [SEL  OE  HI  LO  RIDER]
    PU        [0    0   0   0    0]
    S1        [1    0   0   0    0]
    S2        [1    1   0   0    0]
    S3        [1    1   1   0    0]
    S4        [0    1   0   0    0]
    S5        [0    1   0   1    0]
    S6        [1    0   0   0    1]
    S7        [0    0   0   0    1]
    PU;
            IF READ THEN S1
    S1:
            S2
    S2:
            S3
    S3:
            S4
    S4:
            S5
    S5:
            S6
    S6:
            IF/READ THEN S7
    S7:
    IF READ THEN S1
    END$
```

The timing diagram of the EP310 is illustrated in FIG. 5 and corresponds to the truth table set forth above. It is appreciated, however, that the outputs of the EP310 include inversions that provide the outputs inverted with respect to the waveforms illustrated in FIG. 5. During operation, the EP310 is controlled to operate in seven states S1–S7 and in a state PU (Power Up) when the system is first energized. A dummy variable RIDER is included to distinguish between the states S1 and S6. The state machine 32 enters state S1 under control of the 3.36 MHz clock when the 13 KHz READ signal goes high. In state S1, the state machine 32 is programmed to output SEL low and $\overline{OE}$, HI and LO high. With $\overline{OE}$ high, the HCTL-2000 outputs $D_0$–$D_7$ are in the high impedance state. At the next 3.36 MHz clock pulse, the state machine 32 is programmed to enter state S2. During S2, SEL and $\overline{OE}$ are low and HI and LO are high. With OE low, the outputs $D_0$–$D_7$ of the HCTL-2000 are enabled. Since SEL is in the low state, the HCTL-2000 outputs the high byte onto the bus 33. On the occurrence of the next 3.36 MHz clock pulse, the state machine 32 enters the state S3. During S3, the HI signal is changed to the low state and latches the high byte on the bus 33 into the latch 34. Upon the occurrence of the next high frequency clock pulse, state S4 is entered which changes the state of the SEL signal and returns the HI signal to high. With SEL and $\overline{OE}$ as issued by the EP310 to the HCTL-2000 during state S4, the low byte is placed on the $D_0$–$D_7$ outputs of the HCTL-2000 and thus onto the bus 33. The next occurring high frequency clock pulse places the state machine 32 into state S5 for providing the LO pulse to the latch 35 thereby latching the low byte therein. The next occurring high frequency clock pulse advances the state machine 32 to the S6 state which turns off the LO signal as well as the OE signal thereby returning the HCTL-2000 outputs $D_0$–$D_7$ to the high impedance state. When $\overline{OE}$ goes high in state 6, the AZREADY signal on the line 37 is placed into its active state thereby permitting readout of the digital bus angle from the latches 34 and 35 onto the bus 39. It is appreciated that during states S2-S5, when the latches 34 and 35 are being loaded, the AZREADY signal is in the inactive state thereby disabling bus reads. When the 13 KHz READ signal goes low, the state machine 32 transitions from S6 to S7 and remains in state S7 until the next rising edge of the READ clock. When READ occurs in state S7, the state machine 32 enters the S1 state to commence reading another sample of the digital angle.

On power up of the equipment, the state machine 32 is placed into the PU state and remains in this state until the first occurring rising edge of the 13 KHz READ clock. When READ occurs, the state machine 32 enters state S1.

Figure 6:
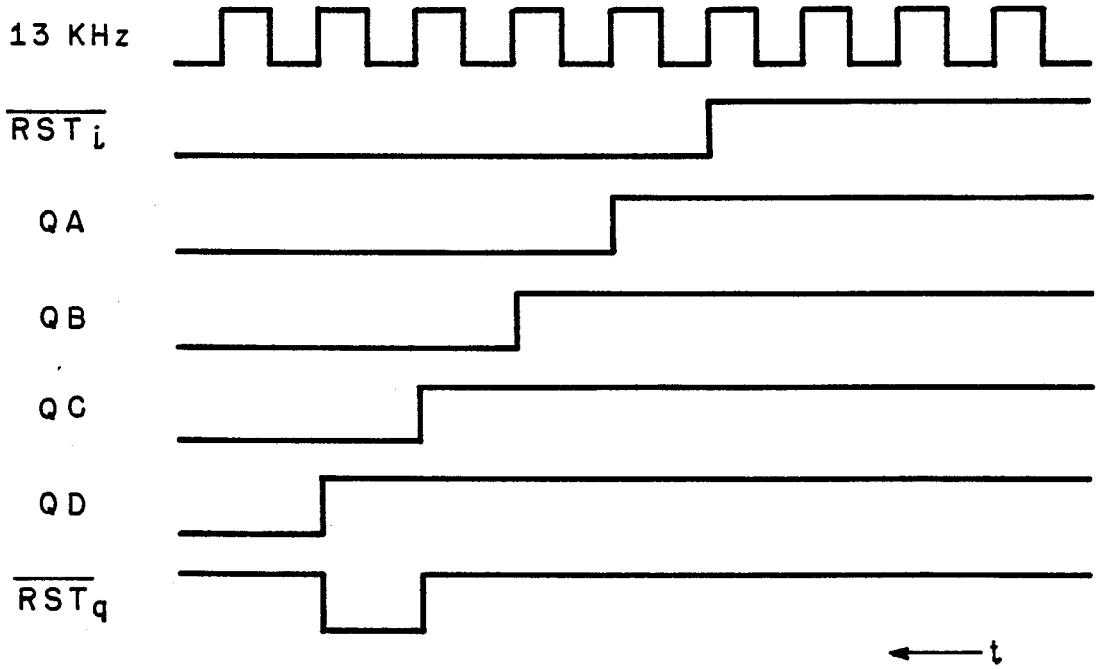
FIG. 6 is a timing diagram illustrating the reset pulse waveshaping aspect of the apparatus of FIG. 4.

The reset pulse from the shaft angle encoder ($\overline{RSTi}$) is processed by the EP310 via the 74LS164 to provide the $\overline{RST}$ pulse ($\overline{RSTq}$) to the HCTL-2000. The RST waveshaping is illustrated in FIG. 6. It is appreciated that by the shift register action of the 74LS164 and the appropriate programming of the EP310, the shaft angle encoder reset pulse that spans four counts is converted to a reset pulse that spans one count and occurs at precisely 0°. If the $\overline{RST}$ pulse were not processed, the angle on $D_0$–$D_7$ from the HCTL-2000 would be held at zero for four counts instead of one. Thus, with the reset pulse processing the azimuth count is zeroed every time the shaft rotates through 0° and then recommences counting thereafter. The processing occurs by gating the $\overline{RST}$ signal through the 74LS164 and causing the signal $\overline{RSTq}$ of the EP310 to be high when the following conditions with respect to the 74SL164 occur: $Q_D=1$, $Q_C=0$, $Q_B=0$, $Q_A=0$, and $\overline{RSTi}=0$. When this occurs, the reset ($\overline{RSTq}$) is held low for only one count.

It is appreciated with respect to FIGS. 2 and 3, that the conventional application of the HCTL-2000 requires a readout that spans a large number of the 13 KHz clock pulses. Thus conventionally, the HCTL-2000 is placed into the inhibit mode for significant periods of time. A comparison with FIG. 5 illustrates that the present invention provides an angle sample for each one of the 13 KHz clock pulses and takes the sample when the clock is high. Since a sample is never taken when the 13 KHz clock is low, the inhibit mode of the HCTL-2000 is never entered. Thus, the state machine of the present invention controlling the HCTL-2000, latches the digital angle at a rate not requiring the use of the inhibit mode. This fast update permits the digital angle to be read and updated continuously. The invention utilizes a state machine implemented by a programmable logic device to drive the HCTL-2000 in contrast to the prior art utilization of a microprocessor. PLDs are less costly than microprocessors and do not require down loading of assembly language as do microprocessors. Additionally, microprocessors require far greater board real estate than do PLDs. The shaft angle encoder interface invention provides a twelve bit digital angle from a shaft encoder with minimal cost and hardware.

In addition to the above, the present invention permits greater than 20% tolerances in the quadrature channels as compared to a tolerance of 12% as obtained in the prior art. This results from the high sampling rate obtained utilizing the 3.36 MHz clock.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Interface apparatus for an incremental shaft angle encoder for measuring the angular position of a shaft, said encoder providing two alternating signals, phase displaced with respect to each other, said interface apparatus providing a digital signal in accordance with the two alternating signals which is representative of the angular position, the apparatus comprising:
   a low frequency clock for providing a low frequency clock signal,
   a high frequency clock for providing a high frequency clock signal,
   an integrated circuit responsive to said two alternating signals and to said low frequency clock signal for providing said digital signal in accordance with said two alternating signals, said integrated circuit further responsive to control signals, including an output enable signal, for controlling outputting said digital signal, said low frequency clock signal utilized to sample said two alternating signals and to time said integrated circuit, and
   a state machine responsive to said low and high frequency clock signals for outputting a sequential plurality of states providing said control signals to said integrated circuit in response to said low frequency clock signal and sequencing said states in response to said high frequency clock signal.

2. The apparatus of claim 1 wherein said integrated circuit includes inhibit logic for inhibiting updating said digital signal in accordance with changes in said alternating signal, wherein said plurality of states are provided in a manner so that said inhibit logic is not enabled.

3. The apparatus of claim 2 wherein said alternating signal outputs comprise square waves in quardature with respect to each other and said integrated circuit includes
an up/down counter,
digital logic responsive to said quadrature square waves for controlling said counter to increment in an upward or downward direction in accordance with changes in relationship between said quadrature square waves,
latch means for latching the output of said counter, said latch means being responsive to said inhibit logic for inhibiting latching said counter output therein, and
multiplexer means responsive to said latch means for sequentially providing a first byte and a second byte comprising said digital signal,
said control signals including a select signal for selecting between said first byte and said second byte.

4. The apparatus of claim 3 further including a first byte latch and a second byte latch responsive to said multiplexer means for receiving and latching said sequentially provided high byte and low byte,
said sequential plurality of states including
(state 1): said output enable signal and said select signal to load said first byte into said multiplexer,
(state 2): said output enable signal and a strobe signal to said first byte latch,
(state 3): said output enable signal and said select signal to load said second byte into said multiplexer,
(state 4): said output enable signal and a strobe signal to said second byte latch,
said first and second byte latches providing said output digital angle signal.

5. The apparatus of claim 4 wherein
said integrated circuit samples said quadrature square waves on a first polarity edge of said low frequency clock signal and activates said inhibit logic on the other polarity edge of said low frequency clock signal, and
said state machine provides said control signals to said integrated circuit in response to said first polarity edge of said low frequency clock signal.

6. The apparatus of claim 3 wherein said encoder provides a reference pulse spanning a plurality of counts of said counter,
said apparatus further including reset pulse waveshaping means responsive to said reference pulse for providing a reset pulse spanning only one count of said counter.

7. The apparatus of claim 6 wherein said reset pulse waveshaping means comprises
shift register means responsive to said reference pulse and said low frequency signal for providing a sequence of pulses in response thereto,
said state machine including means responsive to said shift register means for providing said reset pulse.

8. The apparatus of claim 5 wherein said integrated circuit comprises an HCTL-2000 and said state machine comprises an EP310.

9. The apparatus of claim 7 wherein said integrated circuit comprises an HCTL-2000 and said state machine comprises an EP310.

10. The apparatus of claim 8 wherein said first and second byte latches each comprise a 74LS273.

11. The apparatus of claim 9 wherein said shift register means comprises a 74SL164 and said first and second byte latches each comprise a 74LS273.

* * * * *